United States Patent [19]

Bollier et al.

[11] Patent Number: 4,729,466
[45] Date of Patent: Mar. 8, 1988

[54] DISTRIBUTION CONVEYOR FOR PRODUCTS

[75] Inventors: Willy Bollier, Goldau; Georg Chvojka, Reussbühl; Heinz Wegmüller, Hinwil, all of Switzerland

[73] Assignee: Daverio AG., Zurich, Switzerland

[21] Appl. No.: 56,318

[22] Filed: May 29, 1987

Related U.S. Application Data

[63] Continuation of Ser. No. 699,648, Feb. 8, 1985, abandoned.

[30] Foreign Application Priority Data

Feb. 9, 1984 [CH] Switzerland ............................ 624/84

[51] Int. Cl.$^4$ ............................................. B05G 47/46
[52] U.S. Cl. ................................. 198/365; 198/475.1; 198/800; 198/802
[58] Field of Search ...................... 198/365, 370, 475.1, 198/477.1, 797, 800, 802, 838, 845, 778; 209/698, 912; 104/25, 172.3, 172.4, 172.5

[56] References Cited

U.S. PATENT DOCUMENTS

| 3,010,564 | 11/1961 | Drew | 198/800 |
| 3,114,332 | 12/1963 | Bacon et al. | 104/172 B |
| 3,115,846 | 12/1963 | Dehne | 104/172.4 X |
| 3,683,817 | 8/1972 | Macomber et al. | 104/172 S |
| 3,812,954 | 5/1974 | Kaletin et al. | 198/800 |
| 4,139,088 | 2/1979 | Olesen | 198/365 |
| 4,278,165 | 7/1981 | Nielsen et al. | 198/365 |
| 4,408,539 | 10/1983 | Wakabayashi | 104/172.4 X |
| 4,413,721 | 11/1983 | Bollier | 198/802 |
| 4,434,884 | 3/1984 | Kettle | 198/778 X |

FOREIGN PATENT DOCUMENTS 547145 8/1956 Italy ............................ 198/845

Primary Examiner—Joseph E. Valenza
Assistant Examiner—Jonathan D. Holmes
Attorney, Agent, or Firm—Weiser & Stapler

[57] ABSTRACT

A distribution conveyor for packages and the like having at least one transport including a carrier on which the packages are placed, and adapted to travel on an endless track responsive to a spaced, free-working chain. Each transport is further provided with cylinders which are connected to the transport for rotation about horizontal and vertical axes, and which are arranged in the direction of travel. The track is provided with generally parallel rails which are vertically arranged in rising, dipping and spiralling running areas so that the carriers are adjusted to remain horizontal in these areas.

10 Claims, 5 Drawing Figures

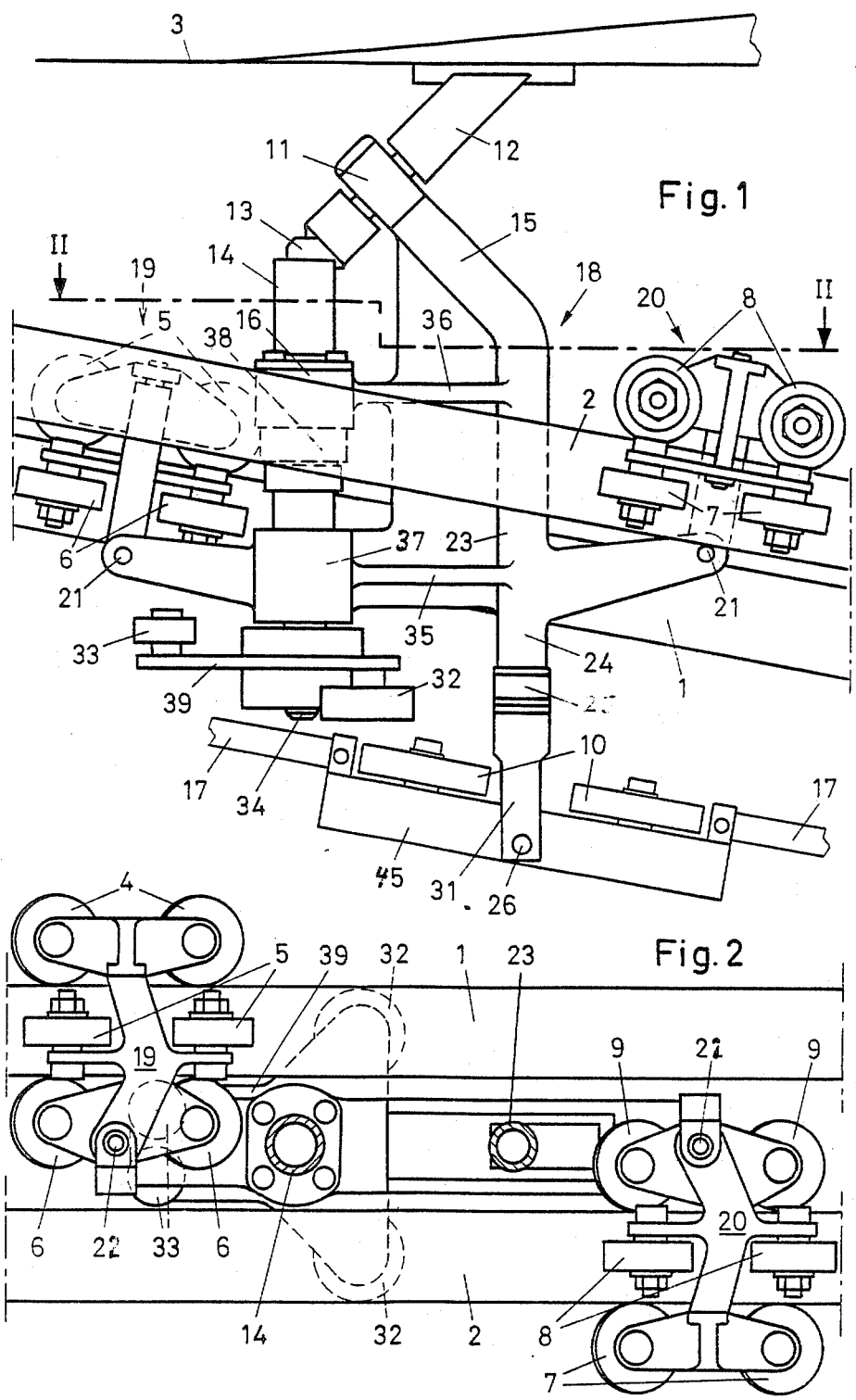

DISTRIBUTION CONVEYOR FOR PRODUCTS

This application is a continuation, of application Ser. No. 699,648, filed Feb. 8, 1985, now abandoned.

The invention relates to a conveyor system for products, packages, or the like, which are carried over areas having changes from the horizontal transporting plane.

From PCT Patent Application No. WO 81/01999, there is known a conveyor system wherein the rails of the conveyor must be arranged in a plane, and large assembly areas are comparatively necessary for installation. The rising cost of land and buildings have given rise to the use and the production of conveyors and sorting plants, and the need to arrange these on rising and dipping areas and, if necessary, on several stories of a building.

An object of the present invention is to provide a conveyor system wherein the rails of the conveyor can be arranged along rising and dipping areas, as well as spirally, in combination with a carrier which remains generally horizontal.

The conveyor system according to the invention provides the advantages that the carrying means for the product is horizontalized separately from the rising and dipping areas and that straight and curved increases and declines of the conveyor can thereby be overcome when the carrying means is in a loaded state. The conveyor system is further characterized by possessing low friction and quiet running as well as being capable of a simple construction.

How the foregoing objects and advantages are attained will be clear from the following description referring to the accompanying drawing illustrating a preferred embodiment of the invention in which:

FIG. 1 is a side view of a transport means at an increasing rail area;

FIG. 2 is a top view of the transport means according to line II—II of FIG. 1;

Figure 3:
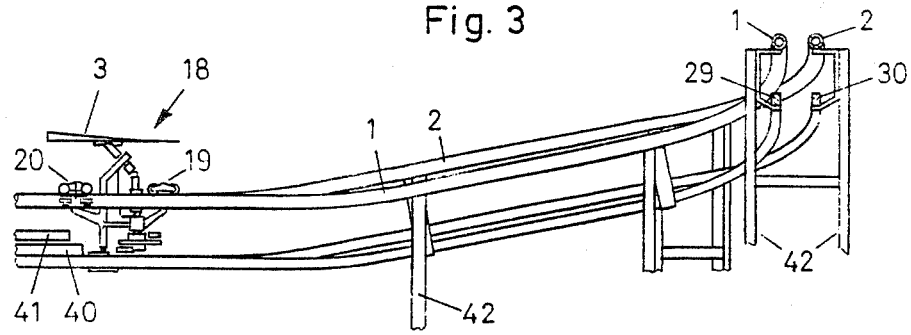
FIG. 3 is a sectional view through a spirally rising section of a conveyor track with a spirally increasing area.

Although specific forms of the invention have been selected for illustration in the drawings, and the following description is drawn in specific terms for the purpose of describing these forms of the invention, this description is not intended to limit the scope of the invention which is defined in the appended claims.

Figure 5:
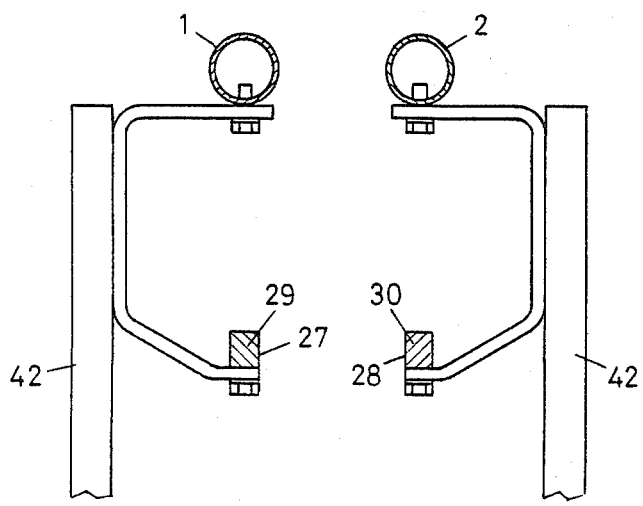
FIG. 5 is an enlarged section of FIG. 3.

FIGS. 1 and 2 illustrates a transport 18 with a product carrier in the form of a disc 3, which is particularly useful in transporting a package (not shown). The package is cast off or removed from the disc 3 by a tipping movement of the disc 3 into a collecting zone. The transport 18 is provided with two cylinders 19 and 20, which are arranged in the travel direction and which roll on guide rails 1 and 2. The cylinders 19 and 20 are each flexibly connected with a horizontal and a vertical axis 21 and 22, respectively, and to the transport body 23 positioned between the rails 1 and 2. The cylinders 19 and 20 both run on two carrying rollers 5 and 8 and two lateral guide rollers 4, 6 and 7, 9. The transport 18 is driven by an endless, space free-working belt or chain 17. The chain 17 is further connected to a cylinder 45. The chain 17 preferably consists of conventional hinged bar links. One or more transports may be used with the conveyor system. The intervals between each transport 18 can be altered, by adjusting the links of the chain 17. A cylinder 45 is positioned on a cam 31 with a horizontal axis 26, and the cam 31 is positioned on a swivel joint 25 on an arm 24 protruding out of the rails 1 and 2. The cylinder 45 is also provided with guide rollers 10, which are positioned on vertical axes and are led through the vertical walls 27 and 28 of the guide rails 29 and 30 (FIGS. 3 and 5). Therefore, a tilting of the transport 18 is prevented as a result of the pulling effect of the chain 17.

The transport 18 preferably has two horizontal arms 35 and 36 with two storage supports 16 and 37 for a vertical spindle 34, which is connected to an inclined spindle 12 by a crosslink 13. The spindle 12 is positioned on an arm 15 of the transport body 23 which protrudes up and out of the rails 1 and 2.

A lever 39 with swivel rollers 32 and return rollers 33 is fastened on the lower end of the spindle 34. Lever 39 rotates spindles 34 and 12 at the unloading zones, so that the disc 3 is inclined to the left or to the right and a package on the disc 3 is dropped or thrown off at a discharge area. The rotation and return of the lever 39 occurs by means of two control rails 40 and 41 which are activated at the loading zones (FIG. 3). In order that a swivel moment that is set on the disc 3 or the spindle 12 is not conveyed to the lever 39, the spindle 34 is connected to a conventional double-sided irreversible locking device 38. Both the end and the middle portions of the disc 3 are defined by the irreversible locking device 38. The spindle 12 can thus be driven by the lever 39 in both turn directions, while the retroacting swivel movements of the spindle 12 are locked onto the lever 39 in both turn directions.

The rails 1 and 2 are preferably round pipes fastened on carriers 42, which can proceed horizontally, rising and dipping, as well as spiralling. In the rising and dipping areas, the rails 1 and 2 are vertically arranged so that the discs 3 may be adjusted horizontally in these areas and the packages carried by the discs do not slip off.

Figure 4:
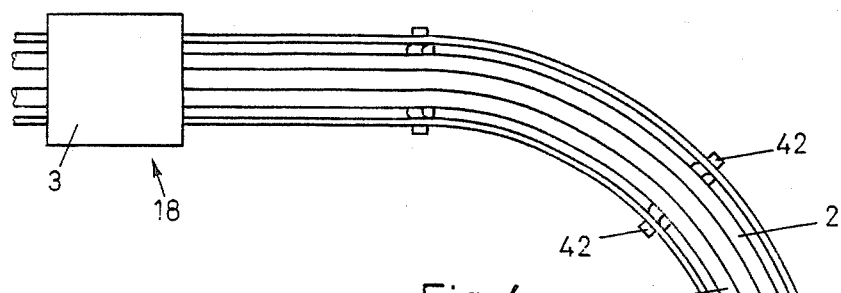
FIG. 4 is a top view of the conveyor according to FIG. 3.

For example, in FIGS. 3 and 4, a primarily horizontally and subsequently spiralling and rising section of a conveyor track is shown. Both rails 1 and 2 run on a horizontal plane and, therefore, both cylinders 19 and 20 run at the same height. While in the rising area, the rail 2 is arranged towards the top relative to the rail 1 so that both cylinders 19 and 20 are at the same height. The positioning of the rails 1 and 2 can be calculated in a simple manner and eventual conversions can be subsequently easily corrected at the conveyor plant. It has been found that in the case of horizontal discs 3, rail inclinations of ±15° can be overcome. The cylinders 19 and 20 cannot make corners, since they are connected flexibly to the vehicle body 23. Also, tolerances in the state of both pipes do not produce any additional friction.

It will be understood that various changes in the details, materials and arrangement of parts which have been herein described and illustrated in order to explain the nature of this invention may be made by those skilled in the art within the principle and scope of the invention as expressed in the following claims.

We claim:

1. A distributing conveyor for packages and the like, and comprising:
    an endless path having inclined ascending and descending zones, and which may include spiral regions, defined by a pair of round tubular carrying rails which are placed at different heights relative to one another in each of said ascending and descending zones; and a plurality of carriages for travelling along said endless path responsive to an endless chain acting on said carriages, and each including a carrier plate for carrying said packages and the like, and only two roller carriers hingedly connected thereto;

wherein a forwardmost one of said roller carriers is guided on one of said carrying rails and a rearwardmost one of said roller carriers is guided on the other of said carrying rails, said roller carriers being staggered in a diagonal arrangement in the direction of travel of said carriages so that the carrying rail for said rearwardmost roller carrier is arranged over the carrying rail for said forwardmost roller carrier in the ascending zones of said endless path and so that the carrying rail for said forwardmost roller carrier is arranged over the carrying rail for said rearwardmost roller carrier in the descending zones of said endless path, while maintaining said carrier plate essentially horizontally in said ascending and descending zones; and wherein said carrier plates are tiltable at predetermined discharge points, responsive to a carriage portion which depends from between said roller carriers and which receives said endless chain, and which includes a guide roller carrier pivoted about a horizontal axis and which is guided by a pair of guide rails spaced from said carrying rails, a rotatable shaft connected to said carrier plate, and a lever operatively connected to said shaft so that said shaft is only rotated at said discharge points by control rails associated with said endless path.

2. The distributing conveyor of claim 1 wherein said endless path includes only two carrying rails.

3. The distributing conveyor of claim 1 wherein each roller carrier is pivoted about a vertical axis and a horizontal axis.

4. The distributing conveyor of claim 1 wherein each roller carrier has two carrying rollers and two pairs of lateral guide rollers.

5. The distributing conveyor of claim 1 wherein the shaft is driven through irreversible locking means.

6. A distributing conveyor for packages and the like, and comprising:

an endless path having inclined ascending and descending zones, which may include spiral regions, defined by a pair of carrying rails which are placed at different heights relative to one another in each of said ascending and descending zones; and a plurality of carriages for travelling along said endless path responsive to drive means acting on said carriages, and each including a carrier plate for carrying said packages and the like, and only two roller carriers hingedly connected thereto;

wherein a forwardmost one of said roller carriers is guided on one of said carrying rails and a rearwardmost one of said roller carriers is guided on the other of said carrying rails, said roller carriers being staggered in a diagonal arrangement in the direction of travel of said carriages so that the carrying rail for said rearwardmost roller carrier is arranged over the carrying rail for said forwardmost roller carrier in the ascending zones of said endless path and so that the carrying rail for said forwardmost roller carrier is arranged over the carrying rail for said rearwardmost roller carrier in the descending zones of said endless path, while maintaining said carrier plate essentially horizontally in said ascending and descending zones; and wherein said carrier plates are tiltable at predetermined discharge points, responsive to a carriage portion which depends from between said roller carriers and which is guided by a pair of guide rails spaced from said carrying rails, and which includes a rotatable shaft connected to said carrier plate and a lever operatively connected to said shaft by irreversible locking means so that said shaft is only rotated at said discharge points by control rails associated with said endless path.

7. The distributing conveyor of claim 6 wherein said rails are round tubes.

8. The distributing conveyor of claim 6 wherein said drive means is an endless chain.

9. The distributing conveyor of claim 6 wherein a guide roller carrier pivoted about a horizontal axis is arranged on said depending carriage portion, and wherein said guide roller carrier is guided on said spaced guide rails.

10. The distributing conveyor of claim 9 wherein said drive means is connected to the guide roller carrier of said depending carriage portion.

* * * * *